Feb. 22, 1944.  A. SHAYNE ET AL  2,342,374
STRAIN GAUGE FOR ROLLING MILLS AND THE LIKE
Filed March 19, 1941  3 Sheets-Sheet 1
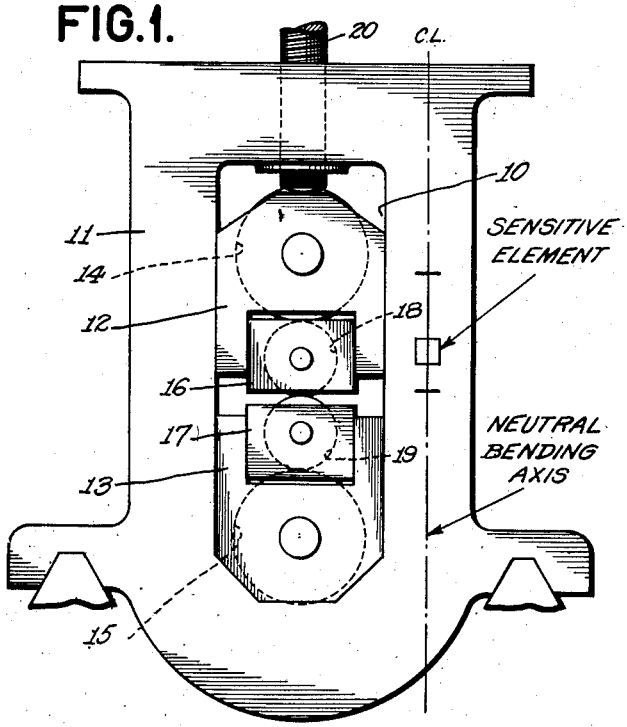
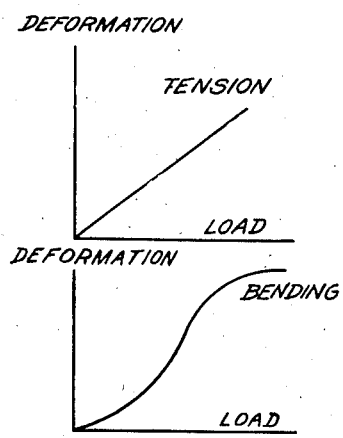
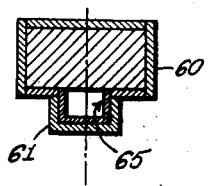
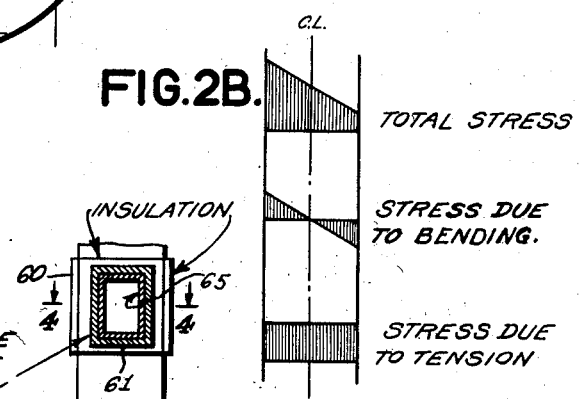
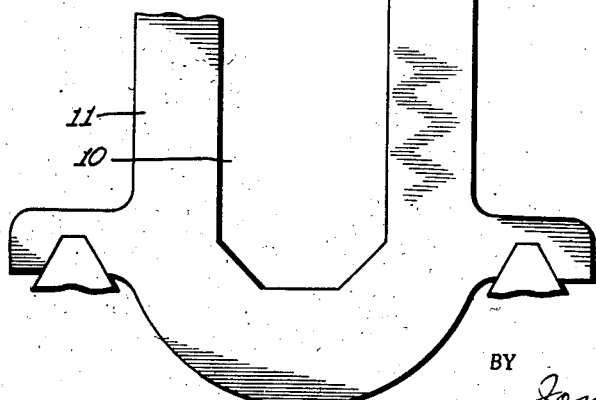
INVENTORS
ALEXANDER SHAYNE
ALEXANDER ZEITLIN
BY Joseph H. Lipschutz
ATTORNEY Feb. 22, 1944.  A. SHAYNE ET AL  2,342,374
STRAIN GAUGE FOR ROLLING MILLS AND THE LIKE
Filed March 19, 1941  3 Sheets-Sheet 2
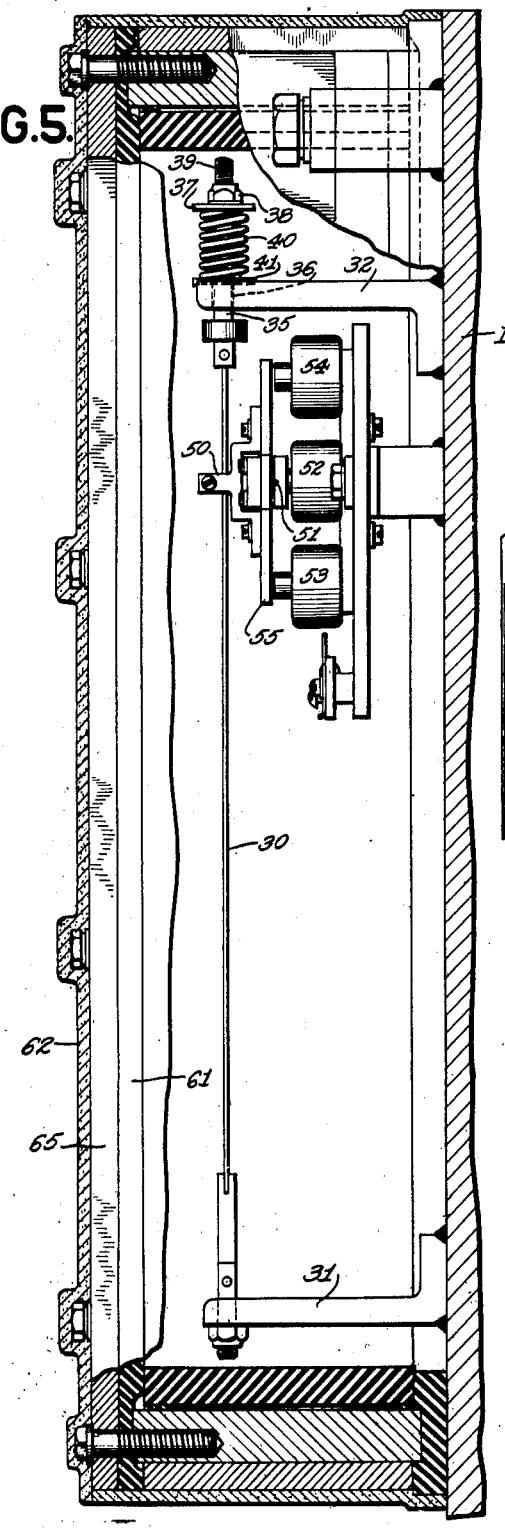
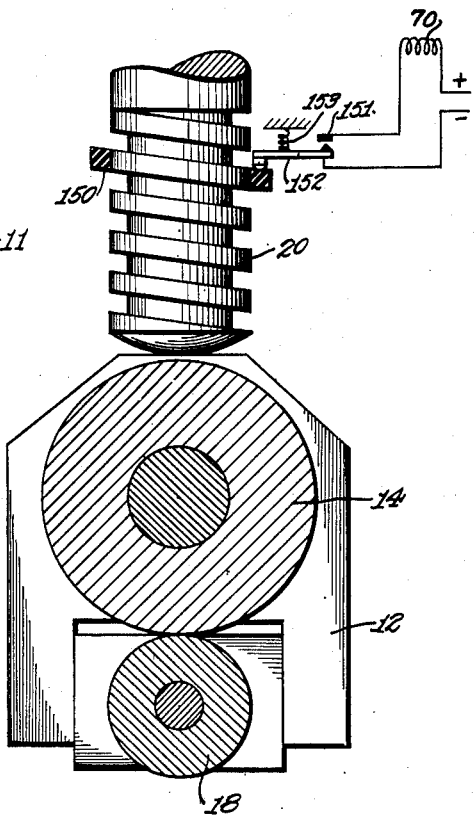
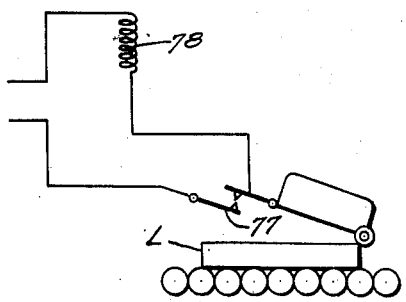
INVENTORS
ALEXANDER SHAYNE
ALEXANDER ZEITLIN
BY
Joseph H. Lipschutz
ATTORNEY

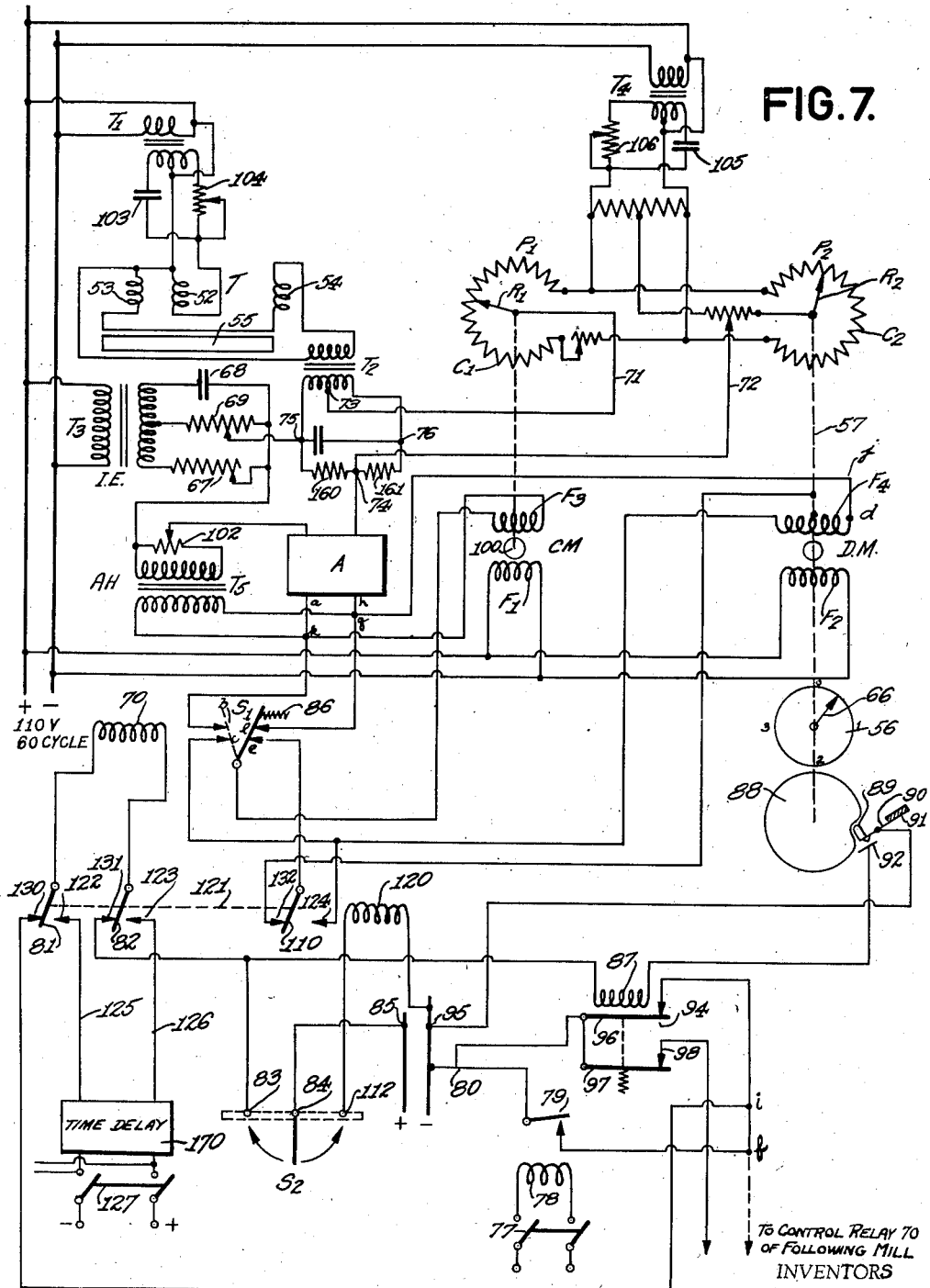

Patented Feb. 22, 1944

2,342,374

UNITED STATES PATENT OFFICE 2,342,374

STRAIN GAUGE FOR ROLLING MILLS AND THE LIKE

Alexander Shayne and Alexander Zeitlin, New York, N. Y., assignors, by mesne assignments, to Sperry Products, Inc., a corporation of New York Application March 19, 1941, Serial No. 384,212

17 Claims. (Cl. 265—1)

This invention relates to instruments or devices for the precise measurement of strain or pressure as it appears in a structural member and manifests itself in the deflection of such member. If any structural member is subjected to load it will change its shape, and this change is proportional to the load applied to the member. Therefore, if the change in shape of the member can be detected by a sensitive member which is caused to respond proportionately to the deflection of the member, the strain may be indicated and by proper calibration may be caused to show the load applied or the stress. More particularly, this invention is adapted to be applied to the measurement of the pressures which are maintained between the rolls of a rolling mill, especially of the continuous rolling mill type wherein a slab of metal is moved by conveyors successively to a plurality of rolling mill stands through which the metal passes under considerable pressure to thin out the same until finally it emerges as a relatively thin continuous strip of substantial length. Each mill stand comprises spaced bearing end frames in which the rolls are mounted, and in modern practice these mills are "four-high" type wherein two intermediate pressure rolls are supported between two heavy back-up rolls.

The passage of the material through such mill causes distortion of the end frames, and the greater the pressure the greater will be the distortion. It was found, however, that if a sensitive element which responds to such distortion were mounted in the positions on the bearing frames of the mills as heretofore proposed, there was not obtained straight line variation of the sensitive element in response to increased load. In other words, the distortion of the sensitive element was not directly proportional to the load. It is therefore one of the principal objects of this invention to provide for a sensitive member responsive to distortion of the bearing frame, which is so mounted on said frame that the distortion of said sensitive element will be directly proportional to the load.

It will be understood that even under the great loads which are present in such rolling mills, amounting in some instances to several million pounds, the distortion of the frame over the length measured will be of a very small order, of perhaps a thousandth of an inch or less. If, now, it is borne in mind that in a hot strip mill, metal of temperatures of 1500 degrees or more is passing through the mill stands, it will immediately become apparent that the factor of temperature and its effect upon both the mill stand frames and the strain responsive member will be vital. This is particularly true in view of the fact that the responsive element is of exceedingly small mass, while the mill stand frame on which it is mounted and whose distortion it is adapted to measure, is a large mass. It is therefore a further object of this invention to provide means which will minimize the temperature variations existing between the strain responsive member and the bearing frame and to equalize the temperatures which affect these parts. For this purpose it is proposed to enclose not only the strain responsive member, but also that portion of the bearing frame with which it cooperates, in heat resisting or insulating material which will tend to equalize the temperatures. It is further proposed to form the strain responsive member of such material that its thermal coefficient will be substantially the same as that of the frame upon which it is mounted.

In spite of the above precautions which are taken to prevent variations in temperature between the strain gauge and the mill frame, there will be variations in temperature of the bearing frames due to the radiation and direct conduction of heat during the rolling operation. This would tend to affect the strain responsive member so that in the course of the mill operation, the strain gauge indication would be subject to error since it would indicate pressures in the bearing frames not due to the pressure existing between the rolls of the mill but rather to the effect of the temperature rise on said frames. It is therefore a principal object of this invention to provide a novel means whereby the effect of temperature on the bearing frames will be continuously compensated in those intervals when no material is passing through the rolls of the mill, and said temperature-compensating means will be rendered ineffective only when material is actually approaching the rolls and is ready to enter the same.

In connection with the feature outlined in the preceding paragraph, it is a further object of this invention to provide novel control means for rendering the strain gauge responsive to pressures in the bearing frame by cutting out the temperature compensating mechanism. For this purpose there is utilized the fact that the operation of turning on the sprays at one of the mills of a continuous rolling mill for the purpose of scale-breaking is a suitable time at which to cut out the temperature compensating mechanism of the pressure indicators. Further, since the mills are spaced closer together near the end of the rolling operation, there is provided means whereby the indication of pressure by the pressure indicators of certain of the rolling mills renders the temperature compensating mechanism of later mills ineffective so that the rolling pressures may be indicated.

Further objects and advantages of this invention will become apparent in the following detailed description thereof.

In the accompanying drawings,

Fig. 1 is a side elevation of one of the two spaced bearing frames of a rolling mill stand showing the positioning of the pressure responsive sensitive element thereon.

Figs. 2A and 2B are diagrams illustrating the theory underlying the above positioning of said sensitive element.

Fig. 3 is a view of a portion of the bearing frame of Fig. 1 showing the heat insulation surrounding the frame and the sensitive element.

Fig. 4 is a section taken on the line 4—4 of Fig. 3.

Fig. 5 is a view partly sectioned showing the details of the sensitive element.

Fig. 6 is a view showing a circuit control by the screw-down motor.

Fig. 7 is a wiring diagram of the general assembly.

Fig. 8 is a wiring diagram showing a circuit control by the passage of material.

While this invention has more general application, as will be apparent from this description, it is described herein as specifically adapted for the measurement of pressures in rolling mills. A continuous rolling mill assembly usually comprises ten mill stands, the first four of which are spaced a considerable distance apart, and the succeeding mills being spaced closer together. A slab of metal is discharged from the furnace onto a conveyor and is passed successively through the rolling mill stands, being reduced in thickness and lengthened as it thins out, until the material which was discharged from the furnace as a relatively small thick slab comes out of No. 10 mill stand as a thin sheet of perhaps 1000 feet in length and travelling at speeds of 1000 to 1500 feet per minute. Each stand in succession applies large pressure to the material passing through it, on the order of several million pounds, and naturally all of the parts of the mill stand including the bearings and the mill frame, are subjected to great strain. The necessity for measuring the pressures during the passage of the material through the rolls is therefore apparent, not only for the protection of the mill stands and the rolls, but also in order that the thickness of the material may be controlled, since the thickness is a direct function of the pressure applied to the rolls.

Each mill stand comprises two spaced sideframes 11. Each side frame of a four-high rolling mill stand has a central cutout portion 10 within which are located bearing blocks 12 and 13 in which the heavy back-up rolls 14 and 15 are journaled. Within the blocks 12 and 13 are smaller blocks 16 and 17 containing the bearings for the working rolls 18 and 19. These working rolls are driven in opposite directions by powerful motors, not shown, and the material to be rolled passes between them. The back-up rolls 14 and 15 have for their purpose the prevention of undue deflection or breakage of the working rolls and are accordingly made much heavier. A large screw 20 bears down on the top of the block 12 to exert pressure against the bearings of the back-up rolls, which in turn force the work rolls together. The screw 20 is therefore a means by which varying pressures may be applied to the material while it is being rolled. This pressure causes the material to decrease in thickness, and as it passes successively through the rolling mill stands it will finally become the thin, long ribbon mentioned hereinbefore, the thickness of which is determined directly by the pressure applied while it passes through the mills.

It will be understood that the application of pressure between the rolls by the screw 20 causes elastic deformation of the lower arch of the frame 11, and it has heretofore been proposed to utilize this deflection as a measure of the pressure between the rolls. A sensitive element was therefore mounted upon this lower arch in such position that it responded to deformation of said arch. It was found, however, that such deformation was not directly proportional to the load so as to give a straight line graph when load was plotted against deformation, and would therefore require calibration for the particular equation or curve of response. One of the principal objects of this invention is the provision of an arrangement whereby the response of the sensitive element will be directly proportional to the load on the frame. One solution of this problem is shown in Figs. 1, 2A and 2B. This solution is based upon a realization of the fact that there are several kinds of stresses present in the upright portions of the mill frame when pressure is applied between the rolls, namely, tension and bending stresses. Referring now to Fig. 2A, it will be seen that as load is applied to the rolls, and therefore strain is present in the frame, the tension which occurs in the upright portions of the frame increases in direct proportion to the load and therefore is a straight line graph. The bending stresses that are present in the same upright portions at the same time and in response to the same load is a graph as shown, which is not directly proportional to the load and therefore is not a straight line. The problem therefore is to obtain a sensitive member which is responsive to load in direct proportion to said load.

Referring to Fig. 2B, there is plotted the stresses which are present in the upright portion of the frame across a horizontal section thereof. It will be seen that the bending stress is greatest at one side of the vertical member, passes through zero at the center line of said member, and increases to a maximum again at the other side of said member. The tensile stress is uniform across the entire member. We now see that the center line C.L. of the vertical member of the frame is the position in which only tensile stress is effective and bending stress is zero. This is apparent from the top graph of Fig. 2B which shows total stress and shows that at the center line the total stress equals the tensile stress, whereas at any other point across the horizontal section of the vertical frame, the total stress is either greater or less than the tensile stress since it is a combination of tensile stress and bending stress.

The first step of this solution, therefore, in obtaining a response which is directly proportional to the applied load, is to mount the sensitive element on one of the vertical members of the bearing frame and in the center line C.L. of said member, which center-line is the neutral bending axis. Therefore only the tensile stresses and not the bending stresses will affect said sensitive element, because the sensitive element is now mounted on the neutral axis insofar as bending stresses are concerned.

Referring to Fig. 5, there is shown the actual construction of the sensitive member mounted so as to respond only to tensile stresses which are generated in the vertical portion of the rolling mill stand in response to loading of the rolls. The sensitive element may take the form of a wire filament 30 connected at its ends to supports 31 and 32 which are welded to the upright portion of the frame 11 in such position that the element 30 is positioned in the neutral axis with respect to bending. The filament 30 is connected to support 31 fixedly and is connected to support 32 yieldably through a resilient connection. The resilient connection is effected by causing one end of element 30 to be fixed to a member 35 slideable in an opening 36 in support 32 and carrying at its outer end a washer 37 locked in position by a nut 38 on the screw threaded end 39 of member 35. A spring 40 is interposed between washer 37 and a washer 41 fixed to the support 32 so as normally tending to maintain the wire 30 in its taut or fully stretched position. When tensile stress occurs in the upright portion of frame 11 it will tend to stretch the frame and carry the wire 30 bodily with the support 31 so that the distance between members 31 and 32 increases so that the member 35 will slide within opening 36 against the action of spring 40. Such movement is of course directly proportional to the tensile stress in the frame, which is in turn directly proportional to the load applied to the rolls within the frame.

In order that the movement of wire 30 shall operate a suitable indicator there is fixed to said wire by means of an arm 50 an armature 55 pivoted at 51 on a torsion wire pivot and symmetrically positioned with respect to three coils, the center coil 52 being the primary, and the outer coils 53 and 54 being the secondary coils of a transformer. Normally, the air gaps between the cores of coils 52, 53 and 54 and the armature 55 are constant; but upon movement of wire 30 in response to stretching of the frame, the armature will be pivoted around pivot 51 to decrease the gap between the armature and the core of the coil 53 and, of course, increase the gap between said armature and the coil of core 54. This produces an electric current which is caused to operate an indicator in a manner to be described hereinafter.

As stated in the introduction to this specification, the factor of heat radiation and heat conduction from the hot metal passing through the rolls with consequent heating up of the mill frames is one that plays a major part in an instrument of this type in which the movements of the sensitive element are small. Thus, it can readily be appreciated that the effect of temperature on the frame 11 can appreciably change the position of sensitive element 30 to a degree comparable with the magnitude of change caused by the pressures which are generated when material is passing through the rolls. Such temperature effects will naturally change the position of armature 55 to introduce an error in the strain gauge or pressure indicator. There are provided two separate means for dealling with this temperature factor, one of which consists in the means for generating a compensating impulse in those intervals during which no material is passing through the rolls. This feature will be described hereinafter. In addition, however, there is provided means whereby the temperature error which may be introduced into the instrument while material is passing through the rolls is materially reduced. For this purpose it is proposed to enclose not merely the sensitive element 30, but also that portion of the frame with which said sensitive element cooperates, within a heat resisting enclosure so that the temperature of the entire cross section of the portion of the frame with which said sensitive element cooperates will be substantially uniform in temperature and, further, so that the temperature of the sensitive element will be substantially the same as said portion of the frame with which it cooperates. Also the rate of change of temperature of the insulated enclosed portion is substantially reduced. Therefore there is provided heat insulating material 60, see Figs. 3 and 4, which completely surrounds that portion of the frame with which the sensitive element cooperates. In addition, heat insulating material 61 is provided around the container 65 which encloses the sensitive element 30.

The movements of the armature 55 produced by movement of the sensitive member 30 vary the air gaps between bar 55 and the coils 53 and 54 of the differential transformer, increasing the gap between said bar and the respective coil at one side and decreasing the gap at the other. This movement causes the transmission of a differential E. M. F. which is caused to operate a dial drive motor D.M., the armature of which carries a pointer 66 or other suitable indicator which will give an indication, e. g., on a dial 56, of the pressure between the rolls of the mill. Since the quantities indicated by the dial are large, the indications are usually in terms of millions of pounds, the 1, 2, 3 corresponding to one million, two million and three million pounds respectively.

The arrangement and mechanism by which the movements of the armature 55 of the differential transformer are caused to operate the pointer 66 are as follows: The electric energy for the system may be taken off any suitable power supply as, for instance, ordinary 110 v. 60 cycle household supply. The power for the differential transformer T (comprising the coils 52, 53, 54) may be taken off the main power line through a transformer $T_1$, the secondary of which is connected to the primary coil 52 of the transformer T. The secondary coils 53, 54 will ordinarily generate equal and opposite pulses in response to the changing cycle in the primary winding 52, provided the gaps between armature 55 and the coils 53 and 53 are equal. When pressure exists between rolls in the mill, the sensitive element 30 is moved bodily to cause armature 55 to pivot around its pivotal support and thus reduce the air gap at one side and increase the air gap at the other side with respect to the secondary coils 53 and 54. This causes said coils to generate a differential E. M. F. which is put into the primary winding of a mixing transformer $T_2$. The full purpose of this mixing transformer will be explained hereinafter but, for the present, it need only be stated that the output from the secondary of said transformer is led to an amplifier A. Interposed between said mixing transformer and the amplifier A may be an interference eliminator I.E. whose purpose it is to compensate for any input signal which may be caused by the presence of such elements as motors and other devices which generate a fairly constant signal.

This interference eliminator may comprise a transformer T₃, the primary of which may be energized from the main power supply and the secondary of which may include a phase shifting device comprising rheostat 67 and condenser 68 in known arrangement so that by means of resistor 69 and the phase shifting elements there may be interposed in the line between the mixing transformer and the amplifier an impulse equal in value and opposite in phase to the impulse which is being generated by the interfering elements in the vicinity. The output from amplifier A extends through a switch S₁ controlled by a control relay coil 70. When the switch is in the dotted line position, a circuit lies from the amplifier A to the field of dial drive motor D.M. by the following connections:

$$a—b—c—F_4—d—g—h$$

F₄ is the auxiliary winding of the dial drive motor D.M. whose main winding F₂ is normally energized from the main power supply. When F₄ is energized by the closing of the contacts b, c of switch S₁, the dial drive motor D.M. is actuated to drive the pointer 66 relative to the dial 56 to indicate the pressure existing between the rolls of the mill since such pressure is proportional to the movement of the sensitive element 30.

From the above description it is obvious that the pointer 66 would continue to be driven indefinitely as long as there was pressure between the rolls and this would not give the correct indication of pressure. In other words, something must stop the pointer when it has reached a position indicating the actual pressure existing between the rolls. For this purpose there is provided a follow-up mechanism as follows:

Upon the shaft 57 of the armature of motor D.M. there is carried a contactor R₂ operating over a resistance C₂, said pointer and resistance forming a potentiometer P₂, and said contactor R₂ and resistance C₂ are connected in opposition to a similar contactor R₁ acting on a resistance C₁ of potentiometer P₁. The potentiometers are connected in parallel across the main supply source by way of transformer T₄, the secondary of which is supplying voltage across diametrically opposite points of said potentiometer circuits. Leads 71 and 72 extend from the said potentiometer contactors R₁ and R₂ to opposite points 73, 74 of the mixing network consisting of the secondary of transformer T₂ and two resistors 160, 161. These points 73, 74 connect points of equal potential in the closed circuit which includes the secondary coil of transformer T₂ and, therefore, the super-positioning of a voltage at these points will not affect the voltage across the secondary of the transformer T₂ at points 75, 76. The points 75 and 76 are also points of equal potential across the potential drop of the follow-up circuit and, therefore, the voltage applied to transformer T₂ from the differential transformer T will not affect the voltage supplied by the follow-up circuit by way of leads 71, 72. The output from the mixing circuit is by way of points 74, 75 which will, therefore, be the differential of the voltage supplied from the follow-up circuit by way of leads 71, 72 and the voltage supplied from the differential transformer T. When the dial motor operates as the result of output from the amplifier A, it operates contactor R₂ on the resistance C₂ to unbalance the follow-up circuit because different voltages are now being tapped by the contactors. This will cause a voltage to be transmitted by leads 71, 72 to points 73, 74. This voltage will oppose the voltage coming by way of the differential transformer across points 75, 76. The further contactor R₂ is operated on resistance C₂, the greater is the unbalance in the follow-up circuit and the greater is the voltage impressed on the mixing network across points 73, 74. This will continue until the voltage supplied from the follow-up circuit to the mixing network is equal and opposite to the voltage supplied from the differential transformer and hence no signal output will be obtained from amplifier A. At this point the dial drive motor will stop by reason of the failure to supply current to auxiliary coil F₄. Since the degree of rotation of pointer 66 is proportional to the degree of rotation of the contactor R₂, and the change in voltage produced by the rotation of R₂ is proportional to the degree of rotation of contactor R₂, and since, further, the amount of voltage change required to bring the motor D.M. to a stop is a function of the movement of the sensitive member 30 and hence of the stress in the frame, it will be seen that, when the dial drive motor stops, the pointer 66 will give an indication which is proportional to the amount of pressure existing between the rolls.

The dial drive motor D.M. is operated when the switch S₁ is in the dotted line position to close contacts b and c. The switch S₁ takes this position only when the control relay 70 is energized, and, for reasons to be fully explained hereinafter, control relay 70 is normally deenergized. This relay 70 will be energized in response to different conditions in the different mill stands. The pressure indicators are usually mounted on stands 5 to 10, inclusive, of a ten-stand continuous rolling mill, the first four stands being merely rough applications of pressure. Beginning with the fifth stand, however, the sheet is being thinned out appreciably and it is desirable to control the pressures carefully and, therefore, the pressure indicators are essential. In the fifth mill stand, that is, the first mill stand equipped with the pressure indicator, we cause the control relay 70 to be energized when the water valve is operated to turn on the scale-breaker water supply. This water supply has as its function to break up the scale which has formed up to that point in the rolling operation and, since the water is turned on just before the sheet reaches No. 5 stand, this fact is utilized in order to render the indicator effective for indicating rolling pressures. For this purpose the passage of material L (as indicated in Fig. 8) toward mill stand No. 5 is caused to operate a switch 77 to energize a scale breaker relay 78 to close switch 79 and thus close the circuit through the control relay 70. The circuit closed by contact 79 through the control relay extends from one terminal 80 of a power supply through switch 79, point f, i, switch 130—81, the control relay 70, switch 131—82, terminal 83 of switch S₂, terminal 84 and return to the power supply 85.

It will be understood that the water supply is turned off before the end of the sheet has passed through the mill stand No. 5 and this would ordinarily cause the control relay to release switch S₁ to permit spring 86 to open the same. In order that the circuit through control relay 70 shall remain closed until the strip has passed completely through the mill stand, there is provided a holding circuit consisting of a holding relay 87 which is energized as soon as pointer 66 starts to rotate. For this purpose said pointer may carry on its shaft 57 a cam 88 so positioned that as soon as the pointer starts to rotate, a member 89 carried by a leaf spring 90 fixed at its outer end 91 is engaged to cause contacts 92 to close the circuit through the hold-in relay 87. This circuit extends from power source 95 through contacts 92 to relay 87 to terminals 83, 84 and return to power source 85. Energization of said relay closes a circuit from supply source point 80, switch 94, i, switch 130—81, control relay 70, switch 131—82, terminal 83 of switch $S_2$, terminal 84 and return to power supply at 85. It will thus be seen that once the hold-in relay is energized, its circuit is independent of the scale breaker circuit through switch 77 and relay 78. In other words, the scale breaker relay 78 can open and this will not affect the hold-in relay circuit which maintains control relay 70 energized. The dial drive motor circuit, therefore, will remain effective until the pointer 66 returns substantially to its zero position at which point cam 88 will permit contacts 92 to open to break the hold-in circuit through relay 70. As shown in Fig. 7, contacts 92 open before pointer 66 has returned completely to its zero position. The point of opening is such that pointer 66 indicates an amount in excess of the maximum error which is likely to be introduced by temperature variations during the rolling of the sheet. Thus, in Fig. 7, the contacts 92 are open although the pointer indicates some 300,000 pounds, which is considerably in excess of the temperature error which can possibly be introduced in the time interval during which a sheet is rolled.

After control relay 70 is rendered effective by the operation of the scale breaker relay at mill stand No. 5, there is also provided means whereby the control relay in the pressure indicator on the next mill stand No. 6 may be energized. For this purpose the hold-in relay 87 operates a double armature 96 and 97 connected as a unit so that when switch 94 is closed in response to movement of pointer 66 of the pressure indicator of mill No. 5, switch 98 will also be closed. The switch 98 controls the circuit to the control relay 70 of the pressure indicator on the succeeding mill. The switch 98 thus corresponds in function to switch 77. The relay 70 on the succeeding mill is provided with a holding circuit like that employed on mill stand No. 5.

For controlling the pressure indicators on the mill stands beyond No. 6, there is utilized the following system:

There is provided in the pressure indicator of mill stand No. 6 a set of contacts similar to contacts 92 so that, as soon as the pointer of mill stand No. 6 begins to operate and closes this set of contacts, the circuits through control relay 70 of mill stands Nos. 7 and 8 are closed. Similarly, the pointer of the pressure gauge on mill stand No. 7 closes a set of contacts similar to 92 as soon as the pointer begins to operate and closes the circuits through the control relays 70 of the pressure gauges on mill stands Nos. 9 and 10.

It will be apparent from the description in the introduction to this specification that other things besides pressure between the rolls may cause bodily movement of the sensitive member 30. The principal item is temperature and this is true particularly in hot strip mills but is found to be the case in all continuous strip mills. Not only does the heat radiated from the strip itself affect the mill frames, but the temperature of the mill building in the course of the working day varies sufficiently to create errors to an appreciable amount. These errors may at times reach several hundred thousand pounds. There is therefore provided means whereby the effect of temperature may be nullified. For this purpose there is utilized the intervals when no material is passing through the mill stands, and hence control relay 70 would ordinarily be de-energized and spring 86 would cause switch $S_1$ to break contacts $b$ and $c$ and make contacts $e$ and $l$. The making of said contacts $e$ and $l$ establishes a circuit through the auxiliary winding $F_3$ of a compensator drive motor C.M. whose main winding $F_1$ is energized from the main power supply. When $F_3$ is energized, it causes its armature 100 to rotate and said armature is mechanically connected to the contactor arm $R_1$ operating on the resistance $C_1$ of potentiometer $P_1$ to unbalance the follow-up circuit previously described. If now the temperature of the mill stand frame rises so that pressure is created in the frame to move the sensitive member 30 relative to said frame, armature 55 will be rocked about its pivot to generate a current which is transmitted to amplifier A and amplified in the same manner as the current generated by movement of element 30 in response to pressure between the rolls created by material passing therethrough, except that in the latter case switch $S_1$ was in the dotted line position to render the dial drive motor D.M. effective whereas, when there is no material passing through, switch $S_1$ is in the full line position to render the compensator drive motor effective. Now, therefore, in the interval when no work is passing through the rolls, but the frame has nevertheless changed its shape because of temperature increase sufficient to cause the sensitive element to generate a current, the output from amplifier A will energize auxiliary coil $F_3$ to cause the compensator drive motor C.M. to rotate arm $R_1$ and unbalance the follow-up circuit until the current generated by the follow-up circuit is equal and opposite to the current generated by the differential transformer T due to change of shape of the frame created by the temperature rise. At this point the motor C.M. will stop. If now the material starts passing through the rolls, and in the case of mill stand No. 5 the scale breaker valve is closed and control relay 70 is energized to move switch $S_1$ to the dotted line position, it will be seen that any current that comes through amplifier A will be over and above the current due to temperature. In other words, the temperature output has been compensated in the interval when no work was passing through the rolls and, therefore, this temperature output is not added to the output caused when work passes through the rolls and, therefore, does not introduce a temperature error. When the switch $S_1$ is in the full line position to energize auxiliary field $F_3$ of motor C.M. there is also short circuited one half of the auxiliary field $F_4$ of motor D.M., as will be seen by tracing the circuit from points J, d, right half of $F_4$, switch 110, e, l, g, h. This short circuiting of one half of auxiliary winding $F_4$ causes motor D.M. to rotate in a direction to restore the dial to exact zero.

When the follow-up current which is passing into the mixing network equals the current transmitted by the differential transformer T, the output from the amplifier A suddenly ceases. The motors C.M. and D.M., whichever happens to be effective at the time, will, however, by reason of their inertia, continue to run and, therefore, will over-run. Such over-running will cause the follow-up circuit to deliver an over-balancing current into the mixing network in the opposite direction to cause reversal of the respective motor which is operating at the time. Thus, a hunting action would be generated. In order to avoid such hunting action, there is provided an anti-hunt circuit A.H. which consists in tapping from the output of the amplifier A at points $g$ and $k$, for example, a small portion of the output and feeding the same back into the amplifier in opposition to the input. The portion tapped may be controlled by means of a transformer $T_5$ and a rheostat 102 of such magitude that it will be particularly effective as the input signal diminishes due to the fact that the compensating impulse begins to equal the differential transformer impulse. Thus a more gradual slowing down of output of amplifier A is obtained with consequent more gradual slowing of the motors C.M. and D.M. and thus overrunning is avoided.

In order to place the phase of the output signal from the differential transformer T in phase with the main fields $F_1$ and $F_2$ of the motors C.M. and D.M., a phase shifter of usual design and comprising condenser 103 and resistor 104 may be interposed between the main supply and the transformer T. Similarly, a phase shifter 105, 106 may be interposed between the main supply and the follow-up circuit in order that the balancing voltages generated shall be in phase with the main fields $F_1$ and $F_2$. Therefore, the output signal from the differential transformer T is in phase with the balancing voltage.

It has been described hereinbefore how in the interval that the compensator motor is effective one half of auxiliary winding $F_4$ is short circuited to return the dial of motor D.M. to zero position. This is desirable because otherwise there would be an incorrect reading if the pressure were super-imposed upon some initial reading. It sometimes happens, however, that there is a substantial increase in temperature during the interval that the power is turned off while the pointer 66 is in operated position. It will be seen that this makes it impossible for the dial to be returned to zero when the current is thrown on again. To permit the dial to be reset to zero under these circumstances, switch $S_2$ is operated to the central position shown, cutting the circuit through control relay 70 of the holding relay to permit switch $S_1$ to move to the full line position and thus short circuit one half of auxiliary field $F_4$ so that it can operate motor D.M. in the reverse direction.

The pressure indicator can also be operated not only to give pressure between the rolls when material is passing therethrough but also to indicate the pressure existing between the rolls when the screw-down motor is operated to pre-load the rolls. For this purpose the switch $S_2$ is operated by hand to position where contacts 84 and 112 are bridged. A circuit is thus established through levelling relay 120 which extends from the power source 95 through relay 120, contacts 112 and 84 back to power source 85. Energization of relay 120 pulls upon an armature 121 which actuates switches 81, 82 and 110 to open circuits at 130, 131 and 132 and close circuits at 122, 123, and 124. In closing circuits at 122 and 123 there is provided a circuit including leads 125 and 126 which is adapted to be closed, as soon as the screw-down motor is energized, by means such as switch 127 which may be the switch which closes the screw-down motor circuit. This energizes the control relay 70 and thus the dial drive motor D.M. is energized in the same way as when work is passing between the rolls. When the screw-down motor is stopped by opening switch 127, the control relay 70 is deenergized, switch $S_1$ is pulled to the full line position and by reason of the contacts 110, 124, a circuit $d$—$g$—$l$—$e$—110—124—$F_4$ is established through the field $F_4$ of the motor to act as a dynamic brake. At the same time, a circuit is closed through auxiliary field $F_3$ extending from $a$, $k$, $F_3$, $l$, $g$, $h$. This renders the follow-up motor effective so as to compensate for any current sent into the amplifier in response to temperature changes in the interval when the screw-down motor is not operating.

When switch 127 is opened to break the circuit through the screw-down motor, the control relay 70 would ordinarily be deenergized, and the compensator would become effective. However, because of its inertia, the motor continues to apply pressure between the rolls, and if the compensator became effective immediately on opening switch 127, the pointer 66 would not be able to indicate the full pressure which exists between the rolls. Therefore there is interposed a time-delay device 170 in the circuit between the screw-down motor and coil 70 to delay deenergization of the latter for the time interval which the motor armature continues to run due to its inertia.

As described hereinbefore, with switch $S_2$ bridging contacts 83—84 the compensation means renders the follow-up circuit effective whenever no material is being rolled. Previous to bridging contacts 83, 84, switch $S_2$ is opened so that one-half of winding $F_4$ is short circuited to drive the pointer back toward zero. Thus the indication of load on dial 66 which had been applied by screws 20 is taken out by the reverse drive of motor D.M. Then switch $S_2$ is caused to bridge contacts 83, 84 before switch 77 is closed to energize relay 70. This means that even in those mill stands where the rolls are preloaded, that is, where pressure exists between the rolls even before the material passes through said rolls, the pointer 66 remains at zero position when no material is being rolled. Thus, when the material passes into a preloaded mill stand, only the increment of pressure will be indicated. In cold strip mills, however, it is desirable to indicate total pressures, that is, preloading plus increment, and therefore it is essential that the compensator mechanism render the follow-up circuit ineffective throughout the period that the rolls are preloaded, and it is only when the screw-down motor is operated to release the pressure between the rolls sufficiently to separate the rolls that the follow-up circuit is rendered effective to return the pointer to zero. A system for performing this function is disclosed in Fig. 6 wherein an insulated ring 150 carried by the screw 20 of the screw-down motor is so positioned that when the screw is in its raised position sufficiently to cause the rolls to disengage, the circuit through control relay 70 is open by reason of the separation of contacts 151 forming a switch in the circuit of relay 70. This means that the follow-up circuit is effective and therefore there is compensation. The upper contact of switch 151 is fixed, while the lower contact is carried by lever 152 which is normally pressed by a spring 153 in such direction as to keep the contacts closed. When the screw 20 is raised, insulation ring 150 engages lever 152 to rock the same against the action of spring 153 and open contacts 151 to render the relay 70 ineffective, and therefore the compensating means including the follow-up circuit, effective. Thus, only during the period that the rolls are separated is the pointer being returned to zero.

In accordance with the provisions of the patent statutes, there is herein described the principle and operation of this invention, together with the apparatus which is now considered to represent the best embodiment thereof, but it is understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. An instrument for indicating the elastic deformation of the end frames of a rolling mill stand under stress and subject to temperature variations, said mill stand having a scale-breaking water spray mechanism cooperating therewith in advance thereof, said instrument comprising a sensitive element adapted to be mounted on said end frame so as to respond to deformation of said frame, an indicator, means whereby said element actuates said indicator, said element responding to deformation of said frame caused by temperature variations as well as deformation caused by material passing through the mill stand, means normally effective for preventing actuation of said indicator, means effective while said preceding means is effective for compensating for responses of said element generated by temperature variations when no material is passing through the mill stand, and means whereby said compensating means is rendered ineffective and the indicator-actuating means is rendered effective when the scale-breaking mechanism is rendered effective.

2. An instrument for indicating the elastic deformation of the end frames of a rolling mill stand under stress and subject to temperature variations, said mill stand having a scale-breaking water spray mechanism cooperating therewith in advance thereof, said instrument comprising a sensitive element adapted to be mounted on said end frame so as to respond to deformation of said frame, an indicator, means whereby said element actuates said indicator, said element responding to deformation of said frame caused by temperature variations as well as deformation caused by material passing through the mill stand, means normally effective for preventing actuation of said indicator, means effective while said preceding means is effective for compensating for responses of said element generated by temperature variations when no material is passing through the mill stand, means whereby said compensating means is rendered ineffective and the indicator-actuating means is rendered effective when the scale-breaking mechanism is rendered effective, and means whereby said compensating means is maintained ineffective as long as said indicator is actuated even though said scale-breaking mechanism is rendered ineffective.

3. An instrument for indicating the elastic deformation of the end frames of a rolling mill stand under stress and subject to temperature variations, said mill stand having a scale-breaking water spray mechanism cooperating therewith in advance thereof, said instrument comprising a sensitive element adapted to be mounted on said end frame so as to respond to deformation of said frame, an indicator, means whereby said element actuates said indicator, said element responding to deformation of said frame caused by temperature variations as well as deformation caused by material passing through the mill stand, means normally effective for preventing actuation of said indicator, means effective while said preceding means is effective for compensating for responses of said element generated by temperature variations when no material is passing through the mill stand, means whereby said compensating means is rendered ineffective and the indicator-actuating means is rendered effective when the scale-breaking mechanism is rendered effective, and means whereby said compensating means is maintained ineffective as long as said indicator is actuated even though said scale-breaking mechanism is rendered ineffective, said last-named means comprising an independent electric holding circuit adapted to be established when the scale-breaking mechanism is rendered effective.

4. An instrument for indicating the elastic deformation of the end frames of a rolling mill stand under stress and subject to temperature variations, said mill stand being one of a plurality comprising a continuous rolling mill adapted to roll sheets of metal, one of said mill stands having a scale-breaking water spray mechanism cooperating therewith in advance thereof, said instrument comprising an element responsive to stresses and adapted to be mounted on the end frame of a mill stand following the mill stand with which said scale-breaking mechanism cooperates, an indicator, means whereby said element actuates said indicator, said element responding to deformation of said frame caused by temperature variations as well as deformation caused by material passing through the mill stand, means normally effective for preventing actuation of said indicator, means effective while said preceding means is effective for compensating for responses of said element due to temperature variations when no material is passing through the mill stand, and means whereby said compensating means is rendered ineffective and the indicator-actuating means is rendered effective when the scale-breaking mechanism cooperating with the preceding mill is rendered effective.

5. An instrument for indicating the elastic deformation of the end frames of a rolling mill stand under stress and subject to temperature variations, said mill stand being one of a plurality comprising a continuous rolling mill adapted to roll sheets of metal, one of said mill stands having a scale-breaking water spray mechanism cooperating therewith in advance thereof, said instrument comprising an element responsive to stresses and adapted to be mounted on the end frame of a mill stand following the mill stand with which said scale-breaking mechanism cooperates, an indicator, means whereby said element actuates said indicator, said element responding to deformation of said frame caused by temperature variations as well as deformation caused by material passing through the mill stand, means normally effective for preventing actuation of said indicator, means effective while said preceding means is effective for compensating for responses of said element due to temperature variations when no material is passing through the mill stand, means whereby said compensating means is rendered ineffective and the indicator-actuating means is rendered effective when the scale-breaking mechanism cooperating with the preceding mill is rendered effective, and means whereby said compensating means is maintained ineffective as long as said indicator is actuated even though said scale-breaking mechanism is rendered ineffective.

6. In a continuous rolling mill comprising a plurality of mill stands, an instrument for each mill stand for indicating the elastic deformation of the end frames of said stands, each instrument comprising a sensitive element adapted to be mounted on the end frame of the respective mill stand so as to respond to deformation, an indicator, means whereby said element actuates said indicator, said element responding to deformation of said frame caused by temperature variations as well as deformation caused by material passing through the mill stand, means normally effective for preventing actuation of said indicator, means effective while said preceding means is effective for compensating for responses of said element due to temperature variations, and means whereby the compensating means of one instrument is rendered ineffective and the indicator-actuating means is rendered effective when the indicator of the instrument on a preceding mill-stand is actuated.

7. In a continuous rolling mill comprising a plurality of mill stands, an instrument for each mill stand for indicating the elastic deformation of the end frames of said stands, each instrument comprising a sensitive element adapted to be mounted on the end frame of the respective mill stand so as to respond to deformation, an indicator, means whereby said element actuates said indicator, said element responding to deformation of said frame caused by temperature variations as well as deformation caused by material passing through the mill stand, means normally effective for preventing actuation of said indicator, means effective while said preceding means is effective for compensating for responses of said element due to temperature variations, and means whereby the actuation of one of said indicators renders ineffective the compensating means of a plurality of succeeding mill stands and renders the indicator-actuating means of said stands effective.

8. In a continuous rolling mill comprising a plurality of mill stands, an instrument for each mill stand for indicating the elastic deformation of the end frames of said stands, each instrument comprising a sensitive element adapted to be mounted on the end frame of the respective mill stand so as to respond to deformation, an indicator, means whereby said element actuates said indicator, said element responding to deformation of said frame caused by temperature variations as well as deformation caused by material passing through the mill stand, means normally effective for preventing actuation of said indicator, means effective while said preceding means is effective for compensating for responses of said element due to temperature variations, means whereby the compensating means of one instrument is rendered ineffective and the indicator-actuating means of said instrument is rendered effective when the indicator of the instrument on a preceding mill stand is actuated, and means whereby said compensating means is maintained ineffective as long as the indicator of the respective instrument is actuated even though the indicator of the instrument on the preceding mill stand is no longer actuated.

9. In a continuous rolling mill comprising a plurality of mill stands, one of said stands having a scale-breaking water spray mechanism cooperating therewith in advance thereof, an instrument for each mill stand for indicating the elastic deformation of the end frames of said stands, each instrument comprising a sensitive element adapted to be mounted on the end frame of the respective mill stand so as to respond to deformation, an indicator, means whereby said element actuates said indicator, said element responding to deformation of said frame caused by temperature variations as well as deformation caused by material passing through the mill stand, means normally effective for preventing actuation of said indicator, means effective while said preceding means is effective for compensating for responses of said element due to temperature variations, and means whereby the compensating means of the instruments on the mill stand with which the scale-breaking mechanism cooperates and on the succeeding mill stand are rendered ineffective and the indicator-actuating means of said stands is rendered effective when the said spray mechanism is rendered effective.

10. In a continuous rolling mill comprising a plurality of mill stands, one of said stands having a scale-breaking water spray mechanism cooperating therewith in advance thereof, an instrument for each mill stand for indicating the elastic deformation of the end frames of said stands, each instrument comprising a sensitive element adapted to be mounted on the end frame of the respective mill stand so as to respond to deformation, an indicator, means whereby said element actuates said indicator, said element responding to deformation of said frame caused by temperature variations as well as deformation caused by material passing through the mill stand, means normally effective for preventing actuation of said indicator, means effective while said preceding means is effective for compensating for responses of said element due to temperature variations, means whereby the compensating means of the instruments on the mill stand with which the scale-breaking mechanism cooperates and on the succeeding mill stand are rendered ineffective and the indicator-actuating means of said stands is rendered effective when the said spray mechanism is rendered effective, and means whereby the compensating means of the instruments on succeeding mill-stands are rendered ineffective when the indicators of the instruments on preceding mill stands are actuated.

11. An instrument for indicating the elastic deformation of the end frames of a rolling mill stand under stress and subject to temperature variations, said mill stand including a plurality of rolls and means including a screw-down motor for effecting pressure between said rolls, said instrument comprising a sensitive element adapted to be mounted on said end frame so as to respond to deformation of said frame, an indicator, means whereby said element actuates said indicator, said element responding to deformation in said frame caused by temperature variations as well as deformation caused by said screw-down motor, means normally effective for preventing actuation of said indicator, means effective while said preceding means is effective for compensating for responses of said element generated by temperature variations when no material is passing through the mill stand, and means whereby said compensating means is rendered ineffective and said indicator-actuating means is rendered effective while said screw-down motor is effective.

12. An instrument for indicating the elastic deformation of the end frames of a rolling mill stand under stress and subject to temperature variations, said mill stand including a plurality of rolls and means including a screw-down motor for effecting pressure between said rolls, said instrument comprising a sensitive element adapted to be mounted on said end frame so as to respond to deformation of said frame, an indicator, means whereby said element actuates said indicator, said element responding to deformation in said frame caused by temperature variations as well as deformation caused by said screw-down motor, means normally effective for preventing actuation of said indicator, means effective while said preceding means is effective for compensating for responses of said element generated by temperature variations when no material is passing through the mill stand, means whereby said compensating means is rendered ineffective and effective and said indicator-actuating means is rendered effective and ineffective when said screw-down motor is rendered effective and ineffective, respectively, and means including a time-delay means whereby rendering said screw-down motor ineffective will render said compensating means again effective after a predetermined lag equal to the time the motor armature continues to run due to its inertia.

13. An instrument for indicating the elastic deformation of the end frames of a rolling mill stand under stress and subject to temperature variations, said instrument comprising a sensitive element adapted to be mounted on said end frame so as to respond to deformation of said frame, means whereby said element controls the transmission of electric voltages proportional to said deformation, means for amplifying said voltages, an indicator, means including an electric motor whereby said voltages actuate said indicator, means whereby said motor controls a balancing voltage, said element responding to deformation in said frame caused by temperature variations as well as deformation caused by material passing through the mill stand, means including an electric motor for controlling voltages to compensate for voltages transmitted in response to temperature variations, means whereby the torques of said motors are reduced to zero when the balancing and compensating voltages are equal to the generated voltages, and means for preventing hunting of said motors because of overrunning of their armatures due to inertia.

14. An instrument for indicating the elastic deformation of the end frames of a rolling mill stand under stress and subject to temperature variations, said instrument comprising a sensitive element adapted to be mounted on said end frame so as to respond to deformation of said frame, means whereby said element controls the transmission of electric voltages proportional to said deformation, means for amplifying said voltages, an indicator, means including an electric motor whereby said voltages actuate said indicator, means whereby said motor controls a balancing voltage, said element responding to deformation in said frame caused by temperature variations as well as deformation caused by material passing through the mill stand, means including an electric motor for controlling voltages to compensate for voltages transmitted in response to temperature variations, means whereby the torques of said motors are reduced to zero when the balancing and compensating voltages are equal to the generated voltages, and means for preventing hunting of said motors because of overrunning of their armatures due to inertia, said last-named means comprising means for feeding a small portion of the amplifier output back into the amplifier in opposition to the main input so that the output will taper off.

15. An instrument for indicating the elastic deformation of the end frames of a rolling mill stand under stress and subject to temperature variations, said mill stand including a plurality of rolls and means including a screw-down motor for effecting pressure between said rolls, said instrument comprising a sensitive element adapted to be mounted on said end frame so as to respond to deformation of said frame, an indicator, means whereby said element actuates said indicator, said element responding to deformation in said frame caused by temperature variations as well as deformation caused by said screw-down motor, means normally effective for preventing actuation of said indicator, means effective while said preceding means is effective for compensating for responses of said element generated by temperature variations when no material is passing through the mill stand, and means whereby said compensating means is rendered ineffective and said indicator-actuating means is rendered effective as long as said screw-down motor is effective to maintain pressure between the rolls.

16. An instrument for indicating the elastic deformation of the end frames of a rolling mill stand under stress and subject to temperature variations, said mill stand having a plurality of rolls, said instrument comprising a sensitive element adapted to be mounted on said end frame so as to respond to deformation thereof, an indicator, means whereby said element actuates said indicator, said element responding to deformation of said frame caused by temperature variations as well as deformation caused by material passing through the mill stand, means normally effective for preventing actuation of said indicator, means effective while said preceding means is effective for compensating for responses of said element generated by temperature variations when no material is passing through the rolls, means cooperating with said material at a point in advance of the point where said material enters the rolls, and means whereby said cooperating means renders said compensating means ineffective and said indicator-actuating means effective before said material enters the rolls.

17. An instrument for indicating the elastic deformation of the end frames of a rolling mill stand under stress and subject to other variations, said mill stand having a plurality of rolls, said instrument comprising a sensitive element adapted to be mounted on said end frame so as to respond to deformation thereof, an indicator, means whereby said element actuates said indicator, said element responding to deformation of said frame caused by said other variations as well as deformation caused by material passing through the mill stand, means normally effective for preventing actuation of said indicator, means effective while said preceding means is effective for compensating for responses of said element generated by said other variations when no material is passing through the rolls, means cooperating with said material at a point in advance of the point where said material enters the rolls, and means whereby said cooperating means renders said compensating means ineffective and said indicator actuating means is rendered effective before said material enters the rolls.

ALEXANDER SHAYNE.
ALEXANDER ZEITLIN.